(12) United States Patent
Holland, IV

(10) Patent No.: US 7,983,979 B2
(45) Date of Patent: Jul. 19, 2011

(54) METHOD AND SYSTEM FOR MANAGING ACCOUNT INFORMATION

(75) Inventor: James Richard Holland, IV, Driftwood, TX (US)

(73) Assignee: Debix One, Inc., Driftwood, TX (US)

( * ) Notice: Subject to any disclaimer, the term of this patent is extended or adjusted under 35 U.S.C. 154(b) by 1095 days.

(21) Appl. No.: 11/373,551

(22) Filed: Mar. 10, 2006

(65) Prior Publication Data

US 2006/0204051 A1 Sep. 14, 2006

Related U.S. Application Data

(60) Provisional application No. 60/660,286, filed on Mar. 10, 2005.

(51) Int. Cl.
*G06Q 40/00* (2006.01)
(52) U.S. Cl. ........................................ 705/37
(58) Field of Classification Search .................. 705/37
See application file for complete search history.

(56) References Cited

U.S. PATENT DOCUMENTS

| | | | |
|---|---|---|---|
| 6,130,621 A | 10/2000 | Weiss | |
| 6,422,460 B1 | 7/2002 | Boesch | |
| 6,434,259 B1 | 8/2002 | Hamid et al. | |
| 6,460,141 B1 | 10/2002 | Olden | |
| 6,934,858 B2 * | 8/2005 | Woodhill | 726/5 |
| 6,940,980 B2 | 9/2005 | Sandhu et al. | |
| 6,970,562 B2 | 11/2005 | Sandhu et al. | |
| 6,973,191 B2 | 12/2005 | Audebert et al. | |
| 6,988,210 B1 | 1/2006 | Audebert | |
| 2002/0161719 A1 * | 10/2002 | Manning et al. | 705/64 |
| 2005/0060263 A1 * | 3/2005 | Golan et al. | 705/44 |

* cited by examiner

*Primary Examiner* — James A Kramer
*Assistant Examiner* — Jessica L Lemieux
(74) *Attorney, Agent, or Firm* — Dubois, Bryant & Campbell, LLP; William D. Wiese

(57) ABSTRACT

A method and system for authenticating the identity of a consumer is disclosed. After the consumer is authenticated by a trusted third party, the consumer designates accounts that the consumer wishes to "lock." When a party requests access to that account, the consumer is notified through the consumer's phone and asked to input a PIN. If the consumer provides the PIN, the requestor is granted access to the consumer's account without requiring further input from the consumer. If the party authorizing the transaction in this "two-factor" authentication does not possess both the phone and the consumer's PIN, or that party elects not to provide the PIN, the request will not be authenticated.

6 Claims, 7 Drawing Sheets

DEBIX

Home > Account Locks

● Home    ● Support    ● Logout

Harry May

Account Locks / My Debix Profile

Debix Locks Remaining: 186 U.S.

Debix Account Activation: January 20, 2005

Buy More Locks

New Requests

| From | Category | Phone Number | Date | Notes |
|---|---|---|---|---|
| Citibank | Auto Loan | (415) 664-2991 ext 3329 | Today | |
| Click to listen ▶ | | (415) 623-1234 | January 14, 2006 | |

See All Requests

My Debix Locks

| Organization | Account Type | Last Access | Status | Locks Used |
|---|---|---|---|---|
| Equifax | Credit File | July 7, 2005 - 12:02 PM | Ok | 1 |
| TransUnion | Credit File | August 4, 2005 - 12:02 PM | Ok | 5 |
| Experian | Credit File | November 11, 2005 - 12:02 PM | Ok | 4 |
| Bank of America | Mastercard | June 6, 2005 - 12:02 PM | Ok | 0 |
| USAA | Financial Services | December 23, 2005 - 12:02 PM | Ok | 1 |
| Addison Avenue Credit Union | Checking Account | January 8, 2006 - 12:02 PM | Failed | 1 |

See Debix Lock History

FIG. 5

All Requests

| From | Category | Phone Number | Date | Status | Notes |
|---|---|---|---|---|---|
| Citibank | Auto Loan | (415) 664-2991 ext 3329 | Today | New | |
| Click to listen | Click to listen | | | | |
| MBNA | Line of Credit | (415) 623-1234 | January 14, 2006 | Granted | |
| | | (415) 264-7733 | Today | Denied | |

FIG. 6

METHOD AND SYSTEM FOR MANAGING ACCOUNT INFORMATION

CROSS REFERENCE TO RELATED APPLICATION

This non-provisional application claims priority based upon prior U.S. Provisional Patent Application Ser. No. 60/660,286 filed Mar. 10, 2005 in the name of James Richard Holland, IV, entitled "Identity Firewall," the disclosure of which is incorporated herein by reference.

FIELD

The method and system of the present invention pertains to the management of a consumer's account information, and more specifically to a system and method for automating the registration, management and controlled disclosure of certain electronic personal identification and financial account data.

BACKGROUND

By stealing a user's personal identification and financial account information, identity thieves breach trusted security mechanisms that are routinely relied upon by consumers, banks, merchants, healthcare providers, and the government. This identity fraud creates two victims: the consumer and the organization that manages the consumer's account. Even the threat of identity theft can create tension between these parties. For example, the risk of identity theft forces consumers to question whether any communication, be it a letter, an email, a website or a phone call, actually originated from the consumer's financial institution. Similarly, the threat of identity theft causes the Consumer's financial institution to take added measures to ensure that the party using a credit card or signing checks is actually the owner of the credit card or the checking account.

In the real world, there are many methods of identity authentication that are commonly used such as letters of introduction to vouch for our credentials and capability, Notary Publics to vouch for the authenticity of a signature, and drivers' licenses to authenticate payment by check. As transactions are increasingly conducted remotely via telephone or the Internet, the need for electronic counterparts of these face-to-face authentication methods has increased dramatically.

In the early days of remote transactions, a consumer would be asked to provide personal information or a password in order to authenticate a transaction. In the simplest of all authentication models, the consumer is asked challenge questions the answers to which require knowledge of the consumer's personal information such as social security number, drivers license number, birth date, mother's maiden name, or the like. Slightly more advanced models employ "single-factor" authentication. Single-factor authentication requires a consumer to present a single "shared secret" such as a password as proof of its validity. Single-factor authentication lacks security because it is so easy for a third party to steal or guess the password. Any purely information-based approach to authentication is vulnerable to increasingly sophisticated identity theft and fraud attacks.

To address this issue, some financial institutions have turned to multi-factor authentication which increases the number of authentication credentials a consumer must present to prove their identity. An example would be a logon system that requires the consumer to have a hardware device, such as, for example, a card, one-time password generator, or plug-in token, along with a password. This is referred to as a two-factor authentication scheme and can be characterized as "something you have" (i.e. the hardware key) and "something you know" (i.e. the password). Multi-factor authentication is much more secure than single-factor authentication because a thief that gains control of the hardware key will still be unable to access an account without the password. In addition, it is possible to include a biometric identifier so that one of the authentication factors becomes "something you are."

The financial liability to organizations has escalated in recent years, largely as a result of legislation like The Sarbanes-Oxley Act of 2002. In addition, new guidance from the Federal Financial Institutions Examination Council (FFIEC) impacts how financial institutions handle sensitive transactions. While the FFIEC report does not say that a financial institution must immediately install strong authentication to protect all Internet banking activities, it does say that the institution must evaluate the risk of each transaction and the data exposed and then institute the proper controls. There is little question that the FFIEC guidance will promote the adoption of strong authentication technologies.

To address the issue of identity fraud, some parties have advocated moving from information-based authentication to these "strong" or "hardened" two-factor authentication systems which requires the consumer to carry a unique physical device. This approach results in great cost to the organization and an unacceptable burden on the consumer. Even in cases where the hardened authentication systems utilize a scheme that a financial institution may deem secure at an acceptable cost, those systems don't address the consumer's need for convenience, nor the need to maintain privacy and integrity of the consumer's personal data.

Nevertheless, the declining cost of technology hardware has improved financial institutions' acceptance of hardened authentication systems. However, the issue of consumer adoption is more complicated. Consumers may be willing or able to carry a device to record and track identifying information and/or account information required by one financial institution, but are typically unwilling to carry multiple devices, one for each of the financial institutions, banks, merchants, healthcare providers, and governmental entities with whom they transact business. Consequently, consumers desire a single strong authentication mechanism that can be used by any of the organizations requiring the consumers identifying information. Moreover, consumers desire a scheme that operates consistently across all commercial transaction environments, whether on-line, over the phone or face-to-face.

There is a need, therefore, for a method and system that prevents fraud using a consumer's identifying information before, during and after a transaction. More specifically, the method and system must address new account fraud, account take-over fraud, payment fraud and general unauthorized access to sensitive personal information. There is also a need for a method and system that assists in the recovery process should identity theft occur. Such a system will be useful for a variety of organizations. For example, the prevention of new account fraud can be further used to minimize employment fraud and the prevention of payment fraud can also be further used to prevent fraudulent health-care insurance claims.

There is also a need for a system which is highly immune to identity fraud attacks. Ideally, such a system would employ multiple security factors, as well as multiple bands of communication prior to authenticating an individual. Such a multi-factor, multi-band system would present a significant technical obstacle for the fraudster to overcome.

There is also a need for a method and system that builds on the rigorous authentication processes that occur when an individual subscribes to, or applies for, credit-based accounts. Such a system will be useful for establishing new relationships with organizations and individuals.

There is a further need for a method and system that protects a consumer's credit file and credit scores by enabling creditors to authenticate new credit accounts prior to opening such accounts in a consumer's name. This provides the consumer with control over the consumer's personal credit not only with conventional creditors, but also from other users of credit files, including insurance and healthcare organizations and potential employers.

BRIEF SUMMARY OF THE INVENTION

The present invention is an improved method and system for authenticating the identity of a consumer. A consumer is first confirmed and authenticated by a trusted third party. Thereafter, the consumer designates accounts that the consumer desires to protect. When an account provider desires to access those accounts, the account provider notifies the trusted third party and the trusted third party contacts the consumer through the consumer's communication device and requests the consumer's PIN. If the consumer provides the PIN, the account provider is granted access to the consumer's account without requiring further input from the consumer. If the party authorizing the transaction in this "two-factor" authentication does not possess both the consumer's communication device and the consumer's PIN, or elects not to provide the consumer's PIN, the request will not be approved.

These features and advantages, as well as others, will be apparent from the following more detailed description of the preferred embodiments of the invention, as illustrated in the accompanying drawings.

BRIEF DESCRIPTION OF THE DRAWINGS

A better understanding of the system and method of the present invention may be had by reference to the drawings, wherein:

FIG. 5 shows a Web page depicting how account locks may be managed and used;

FIG. 6 shows a Web page depicting a summary of all of a consumer's lock activity.

DETAILED DESCRIPTION OF THE INVENTION

Figure 1:
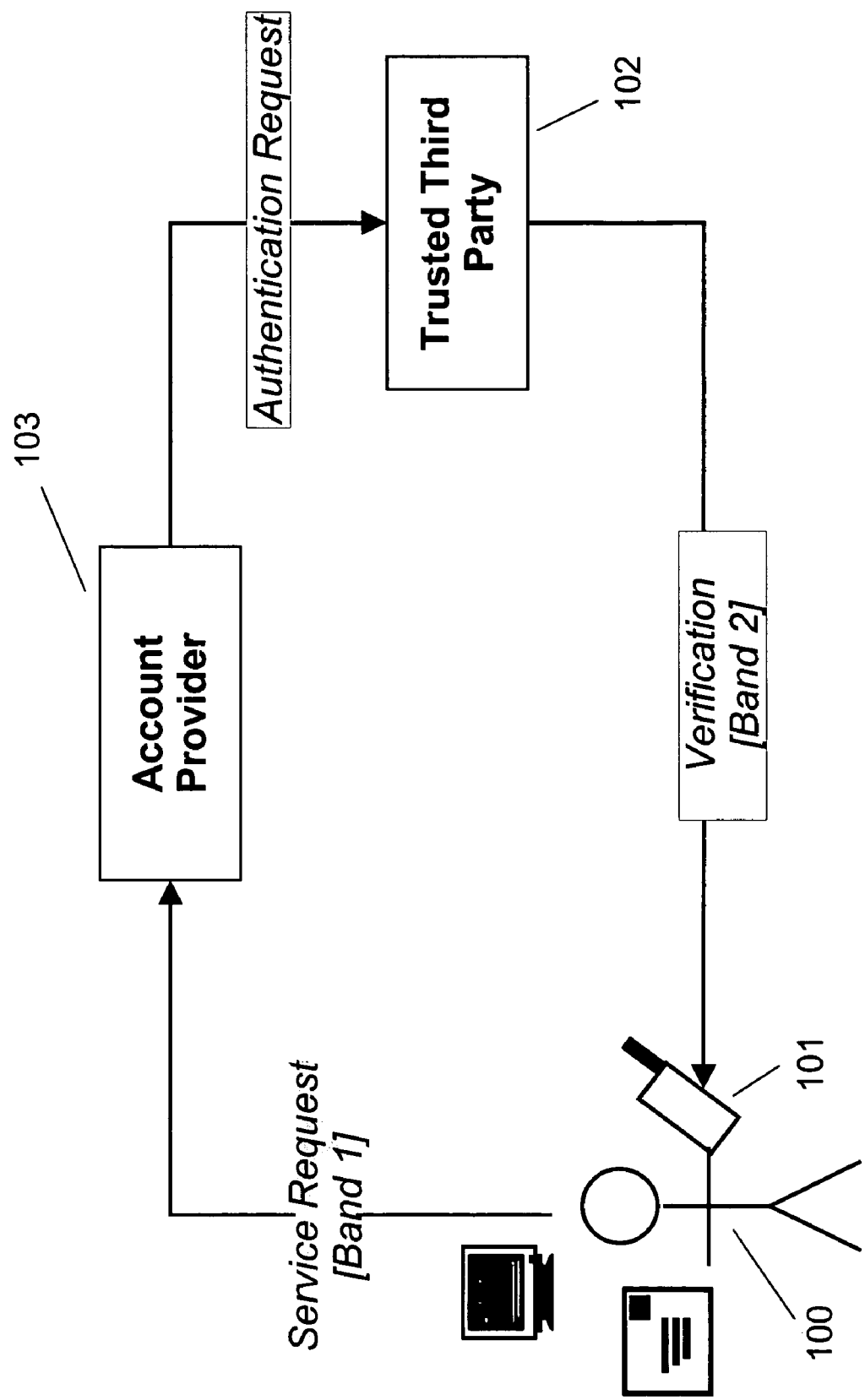
FIG. 1 shows a block diagram depicting the mobile account set up process.

The present invention is an improved method and system for managing a consumer's account information. The invention may be used in connection with transactions between consumers on the one hand and financial institutions, banks, merchants, healthcare providers, governmental entities or any other party engaged in transactions with consumers in which identifying information is exchanged. Accordingly, the words "financial institution," "bank," "merchant," "healthcare provider," and "governmental entity" are used interchangeably herein. Similarly, the words "organization," "enterprise," "corporation," "company," "venture" and "operation" are used interchangeably herein and can be used to describe private organizations or governmental entities and are not meant to be limiting.

A "user," "consumer" or "subscriber" may be a human user or may be a software process that is configured to access an electronic account.

An "account provider" can be an organization that provides its users with general access, such as a merchant account, a bank account, a telephone account, a mortgage account, a dating site account, a credit card account, a debit card account, an auto loan account, a checking account, an ACH account or an EFT account.

The term "network" can mean the Internet, a wide area network, a local are network or any other aggregation of more than one computer without regard to the topology of the network, the protocols used in communication on the network, or the method by which devices on the network communicate.

Also, in general the terms "identity" or "identifier" mean a password, account name, personal identification number, biometric identifier, permission level or other attribute identifying or pertaining to the user in some manner.

Although contact with the consumer is described herein as being made through a "telephone," it is equally possible to make such contact through a two-way pager, a personal digital assistant or a unique device designed specifically for the purpose of verifying PINs.

It is important to note that while the present invention has been and will continue to be described in one embodiment as a system, those skilled in the art will appreciate that the present invention is capable of being distributed as a program product in a variety of forms, and that the present invention applies equally regardless of the particular type of media used to actually carry out the distribution. Examples of suitable media include recordable type media such as CDROM and suitable transmission mechanisms include digital and analog communications links.

In its various embodiments, the present invention is useful in creating a consumer registration process, a consumer authentication process, an account set-up and transaction authorization process, and a fraud recovery process, all of which allow an individual consumer to control critical identifying data and to eliminate unauthorized transactions and which allow an organization to clearly and authoritatively authenticate that consumer. The present invention can interact with consumers through a directly connected terminal, a remote fixed-point or mobile terminal, any device with a browser that is connected to a computer network, a phone or a message-based terminal.

Referring now to the drawings, FIG. 1 is a diagram showing the identity confirmation process in which the consumer is using a mobile phone to confirm their identity to the Trusted Third Party. In one embodiment of the invention, the consumer 100 will demonstrate possession of their mobile phone and ability to access their associated carrier account to confirm their identity and bind their phone number to their Trusted Third Party Account. In this embodiment, the account provider 103 is a carrier and could be any provider of telephony services (mobile or fixed line) such as, for example, Cingular, Sprint, T-Mobile, Verizon, or AT&T. To complete the confirmation process, the consumer 100 is required to have possession of a communication device 101, such as a cell phone, a personal digital assistant, or other electronic device with network access, must have an account password with their account provider 103, and must be located in their home calling area. Once access is granted, the system validates the consumer's 100 personal profile data, such as name, address, social security number or the like, to determine the consistency of such data with previously collected data. Successful account access demonstrations and consistent personal profile data create a strong third party identity confirmation. As these confirmations are accumulated, an identity history is established that can be utilized to ensure that an individual is, in fact, who they claim to be.

The consumer 100 initiates the confirmation process by using their communication device 101 to place a call or send an electronic message to a trusted third party 102, thereby using one band of communication. The communication can be made to a live operator or to an electronic recipient such as, for example, an interactive voice response system. In the voice or electronic message, the consumer 100 will provide the name of the consumer's account provider and a mobile account password known only to the consumer 100 and the account provider 103. The mobile account password can be any password known to the two parties but is commonly the consumer's online account password or phone mail password. The trusted third party provider 102 will then make an authentication request to the account provider 103. Thereafter, the account provider 103 will validate access to the subscriber's account and provide the personal profile information to the trusted third party 102. The authentication occurs over a communication band that is distinct from the communication band used by the consumer 100 to request service from the account provider 103, and can be implemented using any unique personal mobile wireless data or voice device and can be used with or without smart cards, one time passwords, cryptogram tokens, GSM/SIM cards, or any other handset or portable communication appliance unique identification or credentialing system. In addition, the account provider 103 and the trusted third party 102 can optionally identify themselves to the consumer 100 through caller ID, pre-recorded voice or sound elements or pre-recorded data or text elements.

If the consumer 100 is authenticated, the trusted third party 102 is authorized to access the consumer's personal profile from the account provider's 103 database and, thereafter, automatically completes the confirmation process without requiring further input from the consumer 100. Once the trusted third party 102 has received the consumer's profile, the trusted third party 102 calls the consumer's communication device 101 and establishes a personal identification number (PIN) with the consumer 100.

Once the consumer 100 has initiated their account, they may engage in secure transactions that must be authenticated by both the physical possession of the consumer's communication device 101 and presentation of the consumer's PIN.

If the party authorizing the transaction in this "two-factor" authentication does not possess both the communication device 101 and the consumer's PIN, the transaction will not be authenticated. In another embodiment of the invention, a "three-factor" authentication may be required for certain transactions in which case the party requesting the transaction must possess the consumer's communication device 101 and the consumer's PIN, and, also, the communication device 101 must be located in the consumer's expected geographic area (e.g. the consumer's home location).

Other features and benefits are inherent in different embodiments of the present invention which will be apparent to those skilled in the art. For example, the trusted third party 102 may collect more than one "phone" field as part of the information collected from the consumer 100. Depending, however, on the information included in that field, the invention could be used for much more than merely authenticating a user. For example, the field may be used to initiate an arbitrary business process such as the initiation of a mortgage process, allowing a bank to process an application or providing back office support information. There are a myriad of such process that may be facilitated through the use of the invention and the use of the process of authenticating a subscriber described herein is not meant to be limiting.

In a common situation, an organization and a consumer 100 may want to engage in a transaction. Prior to engaging in the transaction, the organization must authenticate the consumer. The consumer 100 can initiate the authentication process by requesting service from the account provider 103. This communication can be by an interactive voice response system, through a network browser, or through an application programming interface. At a minimum the organization must provide the phone number associated with the consumer's communication device 101. However, other information, such as the consumer's billing zip code or the numeric portion of the consumer's billing street address, may also be required to prevent false authentication requests. Once the organization has provided the required information to the trusted third party 102, the trusted third party 102 places a call to the consumer's communication device 101 and requests authentication for the transaction. The consumer 100 can then either authenticate the transaction by providing the consumer's PIN or decline to authenticate the transaction by refusing to provide the consumer's PIN. If authenticated, the transaction continues in a normal manner.

It will be appreciated by those skilled in the art that the present invention is highly resistant to identity fraud attacks because the system employs multiple security factors, as well as multiple bands of communication, prior to authenticating an individual. For example, a thief may compromise an individual's personal computer to steal usernames and passwords and use that information in an attempt to access the individual's bank account over the Internet or through a call center. However, in the present invention the bank would switch to a physically separated band of communication to initiate an outbound request to the individual's phone to collect the PIN, thereby employing multiple bands of communication prior to allowing the thief access to the individual's account. Such a multi-factor, multi-band system would present a significant technical obstacle for the thief to overcome.

In addition, it should be appreciated that the present invention builds on the rigorous authentication processes that occur when an individual subscribes, to or applies for, credit-based accounts. For example, an individual can confirm their identity by demonstrating access to their mobile telephone account by providing the username and password known only to the subscriber and the mobile carrier. Once access is granted, the system validates the personal profile data, such as name, address, and social security number, and then validates the phone's physical location to determine consistency with previously collected data. Such demonstrations of account access and consistency in personal profile data constitute a third-party identity confirmation. As confirmations such as this are accumulated, they establish an identity history that can be utilized to ensure that an individual is in fact who they claim to be. This feature of the present invention is useful in establishing new relationships with organizations and individuals.

The present invention is also useful for protecting a consumer's credit file and credit scores by enabling creditors to authenticate new credit accounts prior to opening them in a consumer's name. This provides the consumer with control over his personal credit not only with conventional creditors, but also from other users of credit files such as insurance and healthcare organizations and potential employers.

In one embodiment of the invention, the authentication system will contain or embed a billing system. Conceptually, the consumer's account is protected by an electronic "lock" and, when a party wants to access the consumer's account as described above, the consumer 100 can "unlock" the account by providing requested information, such as the consumer's PIN. The billing system will record these "authentication events," which are attempts to open locks. These authentication events, may open a lock, or fail to do so, but are recorded in any event. Arbitrary pricing schemes may be implemented around these events, including per-lock pricing schemes, lock-bundle pricing schemes, or unlimited use within a time-period scheme. The locks may be purchased by the consumer 100, or on behalf of consumer 100.

For example, a consumer 100 may subscribe to the trusted third party's 102 services and purchase 50 locks from the trusted third party 102. That subscriber may then associate locks with the subscriber's credit file at a credit bureau, with the subscriber's account at financial institution A, and locks with subscriber's account at financial institution B. As an authorization is attempted, the lock is consumed, and another lock automatically re-applied to the account, much like a seal. When all of the subscriber's authorized locks (from a pool of pre-paid locks, or from a periodic billing cycle limit) are consumed, the subscriber must re-authorize the purchase of additional locks.

Figure 2:
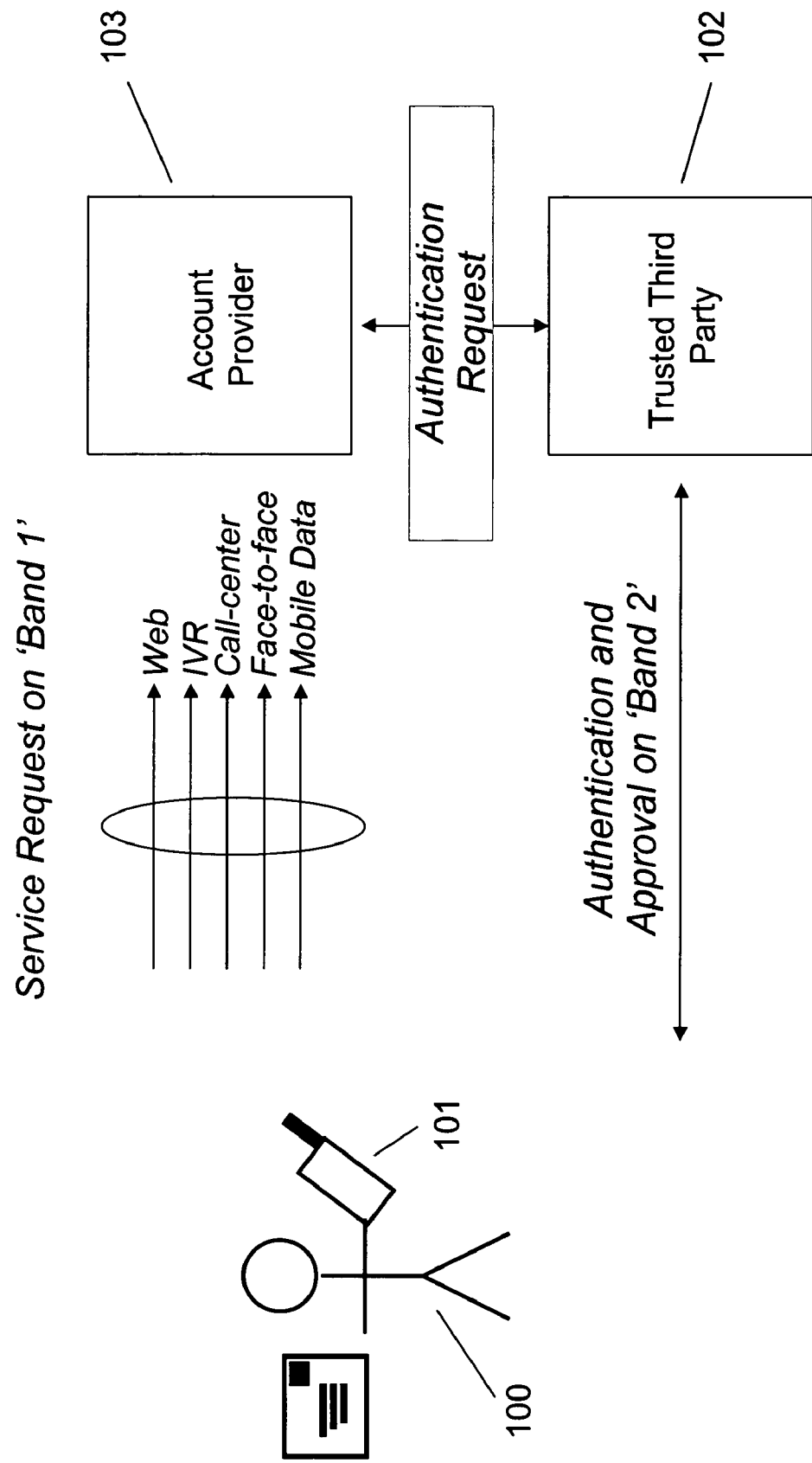
FIG. 2 shows a diagram depicting the multiple communications bands used in one embodiment of the invention.

The multi-band aspect employed in one embodiment of the invention is shown in FIG. 2. The consumer 100 commences the process by using communication device 101 to contact the account provider 103. The service request can be made over a variety of different communication bands, including the web, through an interactive voice response system, through a call center, by face-to-face communication, or by the transmission of mobile data. The account provider 103 makes the authentication request to the trusted third party 102. The trusted third party 102 then contacts the consumer 100 through a communication band that is separate and distinct from the communication band used by the consumer 100 to contact the account provider 103.

Figure 3:
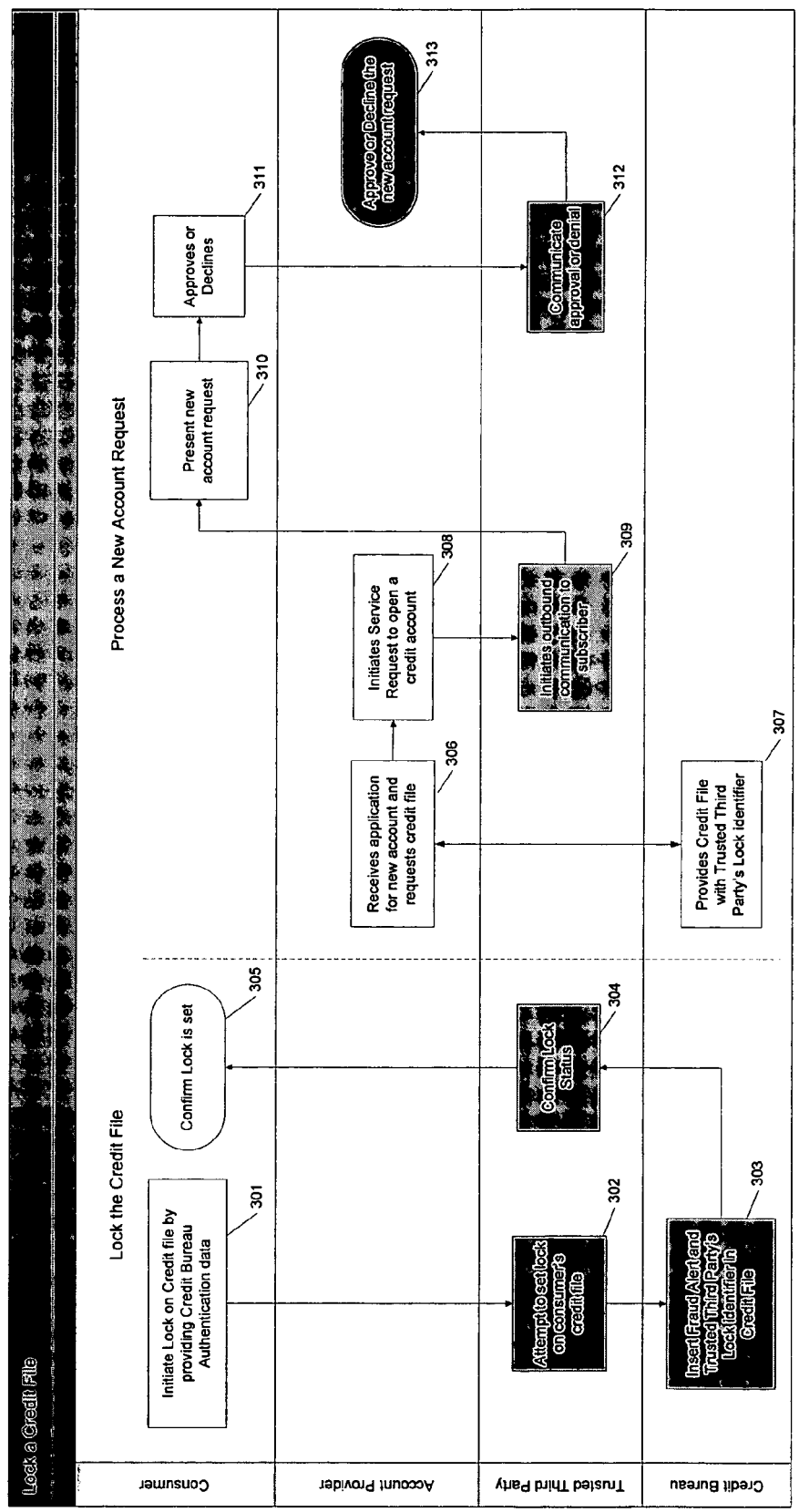
FIG. 3 shows a flow diagram depicting the process for locking a credit file and for processing a new account request.

FIG. 3 shows a flow diagram depicting the actions taken by the participants in one embodiment of the invention when locking a credit file and processing a new account request. The consumer first initiates a lock on the credit file by providing the trusted third party the authentication information required by the credit bureau to access the consumer's credit file 301. The trusted third party attempts to set a lock on the consumer's credit file 302. The credit bureau then inserts a fraud alert, as well as information identifying the trusted third party and the lock identifier in the consumer's credit file 303. The trusted third party confirms the lock status 304 and the consumer confirms that the lock is set 305. When processing a new account request, the account provider, such as the carrier used in the example in FIG. 1, receives an application for an account and requests the credit file from the credit bureau 306. The credit bureau provides the credit file with the lock information to the account provider 307. The account provider then initiates a service request to the trusted third party to open a credit account 308. The trusted third party initiates an outbound communication to the consumer 309. Once presented with the new account request 310, the consumer can either approve or deny the request 311. The third party receives notification of the consumer's approval decision 312 and communicates the decision to the account provider 313.

Figure 4:
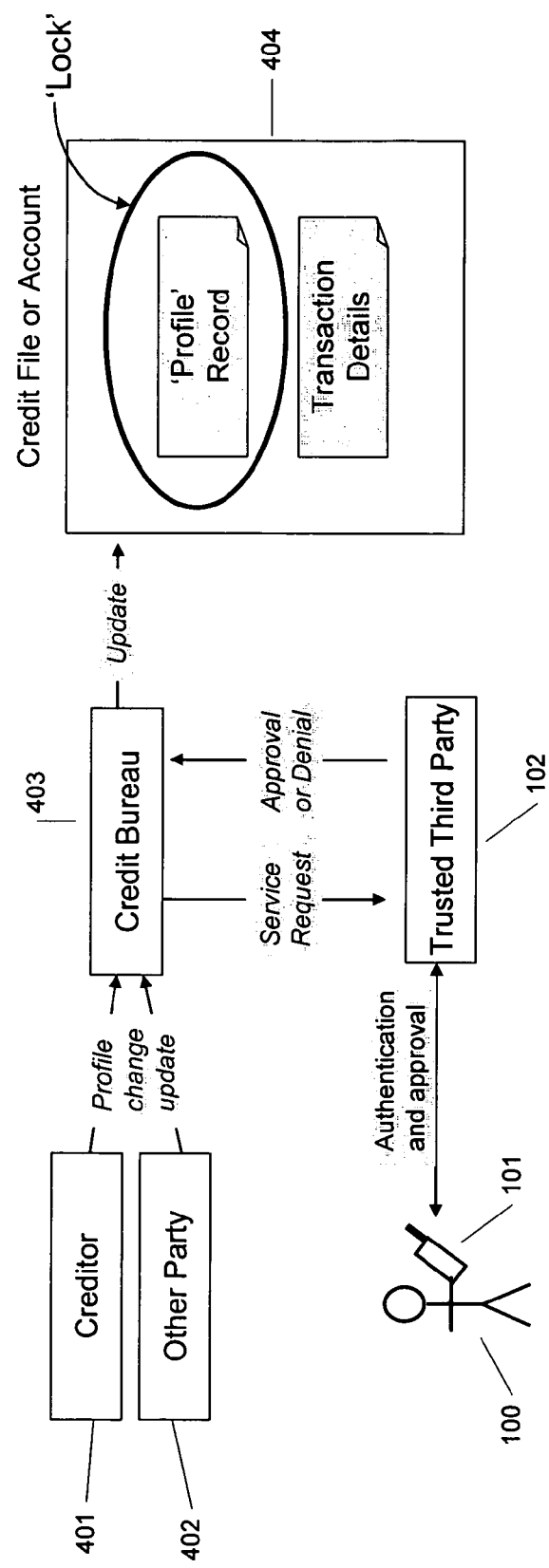
FIG. 4 shows a diagram depicting the process for updating a credit file in one embodiment of the invention.

FIG. 4 shows a flow diagram depicting how the actions taken by the participants in one embodiment of the invention when the consumer's locked credit profile is updated. In this embodiment of the invention, before the consumer's profile data contained in the credit file or account 404 of a trusted third party subscriber 100 may be updated by a party other than the subscriber 100, the party requesting to update the credit file or account 404 must receive approval from the subscriber 100. When a creditor 401 or other party 402 desires to update a subscriber's credit file 404 at a credit bureau 403, the creditor 401 or other party 402 makes a request to the credit bureau 403. The credit bureau 403 notifies the trusted third party 102 of the request and, in turn, the trusted third party 102 authenticates the subscriber and obtains the subscriber's approval for the update. The trusted third party 102 notifies the credit bureau 403 of the approval whereupon the credit bureau 403 updates the credit file or account 404 as requested by the creditor 401 or other third party 402.

FIG. 5 shows a Web page showing a how account locks may be managed and used. At the bottom of the screen, all of the consumer's locks are identified by organization, account type, last access, status and locks used. The middle of the page identifies new requests that have been received by the trusted third party. At the top of the page, a link is presented through which the consumer can purchase additional locks.

FIG. 6 shows another Web page that is accessed by clicking on the "See All Requests" link on the Web age shown in FIG. 5. On this screen, the consumer can review a list of the requests for access to the consumer's locked accounts.

Figure 7:
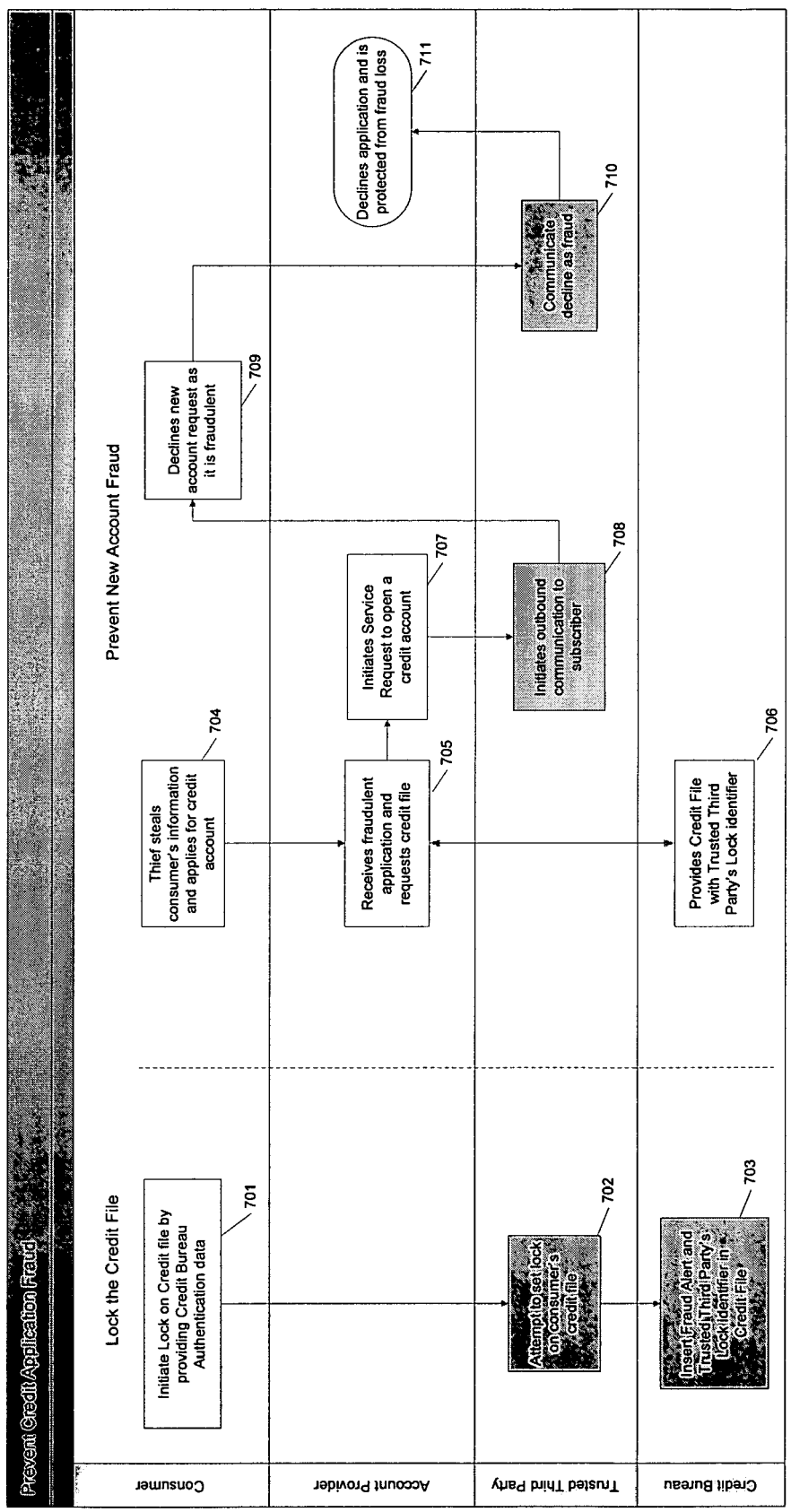
FIG. 7 shows a flow diagram depicting the typical actions of the parties when encountering application fraud.

The previously described embodiment can also assist consumers and creditors in preventing application fraud such as when an imposter attempts to use a stolen identity to open accounts or secure credit in a consumer's name. FIG. 7 shows a flow diagram depicting the typical actions of the parties when encountering application fraud. In this instance, the consumer first initiates an account 701 with the trusted third party. The trusted third party places a lock on the consumer's credit file 702. The contacted credit bureaus then make the appropriate notation in the consumer's file 703 so that, when a party such as, for example, a creditor, bank, merchant or employer requests a copy of the consumer's credit file, they will be instructed to contact the trusted third party to authenticate the application with the consumer prior to opening the account. When a party not authorized by the consumer applies for a new account from an account provider under the consumer's name 704, the account provider will request the consumer's credit file from the credit bureau 705. The credit bureau will then provide the account provider with the consumer's credit file and the trusted third party's lock identifier 706. The account provider can then request authentication of the new account application by providing one or more of the following pieces of information: trusted third party lock identifier, consumer's phone number, credit amount and applicant name 707. In response to the account provider's request, the trusted third party will initiate an authentication request by providing the consumer with the name of the creditor and account type 708. Because the consumer did not apply for credit in this example, the consumer would elect not to enter the consumer's PIN and would, instead, press another key, such as the star button, on the consumer's phone indicating that the account request is not authorized 709. The trusted third party then reports the fraudulent request to the credit bureaus and others 710 and denies the application 711.

It is important to note that the fraud control aspect of the present invention may be used for a wide variety of uses beyond fraud control. For example, if fraud is detected or suspected in a credit card transaction, the credit card issuer can deactivate the credit card, can contact the consumer through the trusted third party to provide added value to the consumer, or can take some other step or measure under the applicable circumstances.

It is important to recognize that the method and system of the present invention can be used in a wide variety of transactions. For example, the process may be used by a financial institution when initiating financial transactions against credit accounts, debit accounts, savings accounts, checking accounts, investment accounts, mortgage accounts and the like. Also, the trusted third party may desire to provide additional related services to the consumer. For example, the trusted third party may elect to guaranty authenticated transactions. More specifically, if a consumer who has initiated an account is the subject of identity fraud in an authenticated transaction, the trusted third party can reimburse the consumer or the organization for costs wrongly incurred in the transaction and/or for assistance in repairing the consumer's credit file.

In another example, the process can be used when managing personal profiles associated with an account such as, for example, the consumer's name, address, contact numbers, etc. In this instance, when an organization receives a profile change request, the organization would contact the trusted third party and provide the consumer's phone number or other identifying information. The trusted third party would initiate an authentication request to the consumer which the consumer could accept by inserting their PIN or reject by inserting an alternative number designated by the trusted third party. If the consumer accepts the request, the trusted third party notifies the organization and the organization makes changes to the consumer's profile.

In yet another example, the consumer may be asked to authenticate an information provider's request to access the consumer's information. Such information may be stored, for example, in a physical vault or stored on an Internet site. The consumer provides the information provider with the consumer's mobile phone number. The information provider initiates a request to the trusted third party who contacts the consumer through the consumer's phone and receives an approval or a denial from the consumer. Based on the consumer's response, the information provider is permitted to access the consumer's information.

In order to implement and maintain the service, the trusted third party will be required to maintain and routinely access the consumer's account information. The equipment to perform this task can be a single-CPU or multi-CPU server, with or without a connected display, with or without a keyboard or mouse, with an embedded or network connected database, with a network interface, with system RAM. The equipment may be a physical unit, a cluster-based server, a mainframe, a virtualized server or a utility-computing based service. The server may, for example, be connected via wire or wirelessly to other servers, terminals, hosts or input-output devices by the means of any number of interfaces, including, but not limited to USB, Firewire, 802.11b, Zigbee, 802.15, Ethernet, TCP/IP, ATM, X.25, Frame-relay and others. The server's main working memory may be implemented using any number of technologies, including but not limited to: RAM, MRAM, Virtual RAM, and Cluster RAM and its fixed data storage may be implemented using any number of technologies including, for example, magnetic mobile media, magnetic fixed-media, NAND-flash memory, NOR-flash memory, MRAM or arrays of the same.

Those skilled in the art will appreciate that the present invention can operate in any environment, whether remote or in-person, which involves a request for identification. Although remote two-factor authentication was exceptionally problematic in the past, the present invention allows a wide variety of transactions to be authenticated including, by way of example, the following:

A. Mobile Payments. The consumer can use an authenticated transaction to send cash to an individual via mobile phone by entering the mobile number of the recipient, the amount, payment account and enter the PIN to confirm the transaction.

B. Retail Stores. An authenticated transaction can occur in a retail store. The consumer initiates payment by swiping a card through a card reader and entering consumer's PIN in the PIN entry device. The trusted third party will then make arrangement for funds to be transferred accordingly.

C. Restaurant. Because PIN entry devices are not typically found in full service restaurants, the procedure for authenticating a transaction is somewhat different than that described in previous examples. To complete an authenticated transaction in accordance with the present invention in a full service restaurant, the consumer provides a card to the server and the server swipes the card as with a credit card. The system changes communication bands and calls the consumer's phone will then ring and prompts the consumer for the PIN. If the consumer elects to input the PIN, the transaction is authorized.

D. Internet Site. To conduct an authenticated transaction through a Web site, the consumer would select the name of the trusted third party on the checkout page and would enter the phone number or other identifying information associated with their account. Once again, the system changes communications bands and calls the consumer's phone and prompts the consumer for the PIN. If the consumer elects to input the PIN, the transaction is authorized.

E. Call Center. An authenticated transaction may also be conducted through a call center. In this case, the consumer would simply provide the call center with the name of the trusted third party and the consumer's phone number. At this point, the system changes communications bands and calls the consumer's phone and prompts the consumer for the PIN. If the consumer elects to input the PIN, the transaction is authorized.

F. ATM. A withdrawal or other transaction through an ATM may be authenticated using the present invention. When the consumer presents the card to the ATM, the consumer simply enters the PIN associated with the consumer's trusted third party account.

G. Mobile Bill Pay. A consumer can pay an invoice from the consumer's phone by selecting the desired invoice to pay, identifying the desired payment account, and entering the consumer's PIN when requested.

H. Mobile Bill Send. A consumer may also send an invoice using the present invention. In this case, the consumer inputs the following information on the consumer's phone: the recipient's mobile number, invoice amount, description of the invoiced amount. Once completed, the consumer pushes "send." This represents a simple method by which small businesses may invoice their customers. For example, a landscaping service could use this service to send invoices to clients before leaving the job site thereby eliminating the need to mail an invoice, wait on a check, deposit the check and wait three additional days for the funds.

The forgoing examples of applications in which various embodiments of the present invention may be used are intended to be representative in nature and are not intended to be exhaustive. In addition, certain additional equipment may be required to implement these and other applications of the service. For example, call center merchants will need to establish a connection to the trusted third party which will enable the call representatives to enter the mobile number to initiate the transaction. Also, a data enabled phone and a data service plan are required for the Mobile Bill Pay example.

It will be appreciated that the present invention provides a variety of improvements over the existing art. For example, the system of the present invention offers significant flexibility by interfacing with external merchant, telecommunication and financial service software systems, real-time and batch data sources, fixed-location and mobile terminals, web-services, IT system APIs, data devices, data networks, wireless location services, IVR systems and SMS gateways. This flexibility creates new or significantly improved uses such as a method for accumulating an 'identity' score for consumers based on previous identity confirmation history; a method for using a consumer's phone, its associated carrier account, and the consumer's knowledge of a PIN to enable two-factor authentication; a method for using the consumer's phone, its associated carrier account, the consumer's knowledge of a PIN, and a geographic location to enable three factor authentication; a method for securely registering a subscriber to a network; a method for authenticating a consumer before extending credit or consummating a transaction; a method whereby a consumer can deny another party's access to the consumer's electronic files or accounts; a method for permitting a consumer to prevent others from opening an account in the consumer's name; a method for permitting a consumer to prevent others from changing information on an account without the consumer's authorization; a method for permitting a consumer to prevent others from engaging in unauthorized transactions through the consumer's account; a method for enabling the consumer to terminate transaction authorizations while they are in progress; a method of implementing an authentication system that functions with a wide variety of transactions (debit, credit and others); a method for providing authenticated transactions in a variety of environments (face-to-face-, over the Internet, over the phone, and others); a method for providing a positive or negative authentication answer to the account provider without compromising the confidentiality of the consumer's information; a method for authenticating a financial institution and consumer to each other over two separate bands; a method for creating and maintaining a "reputation" score that may be useful to the financial institution in determining whether to provide a service or engage in a transaction; and, a method for preventing customer service representatives or employees of a financial institution from gaining access to sensitive consumer information.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible identity verification scenarios, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for establishing a credit account comprising:
receiving initial information from a consumer sufficient to permit a trusted third party to establish said consumer as a subscriber of said trusted third party's services;
establishing said consumer as a subscriber of said trusted third party, wherein the number for accessing a communication device of said subscriber is retained on one or more hardware devices by said trusted third party;
said subscriber requesting a credit account from an account provider;
said account provider contacting a credit bureau and requesting said subscriber's credit file;
said credit bureau providing said account provider with said subscriber's credit file containing contact information for said trusted third party and identifying information for said subscriber;
said account provider requesting authorization from said trusted third party to open said subscriber's account;
said trusted third party contacting said subscriber on said subscriber's communication device;
said subscriber providing said trusted third party with confirmation that said subscriber desires said account provider to be provided access to said credit file; and
said trusted third party authorizing said account provider to proceed in opening said account on behalf of said subscriber.

2. The method of claim 1, wherein said account provider is a provider of telephony services.

3. The method of claim 1, wherein said communication device is a cellular telephone.

4. The method of claim 1, wherein said subscriber must be located in said subscriber's home calling area.

5. The method of claim 1, wherein said initial information provided by said subscriber to said trusted third party is provided from a device separate from said subscriber's communication device.

6. The method of claim 1, wherein said subscriber providing said trusted third party with confirmation is accomplished through the entry of a personal identification number on said subscriber's communication device.

* * * * *